Sept. 23, 1969    L. GYUGYI    3,469,170
FIRING CIRCUIT FOR SEMICONDUCTIVE CONTROLLED RECTIFIERS
Filed Sept. 11, 1967

United States Patent Office 3,469,170
Patented Sept. 23, 1969

3,469,170
FIRING CIRCUIT FOR SEMICONDUCTIVE CONTROLLED RECTIFIERS
Laszlo Gyugyi, Pittsburgh, Pa., assignor to Westinghouse Electric Corporation, Pittsburgh, Pa., a corporation of Pennsylvania
Filed Sept. 11, 1967, Ser. No. 666,911
Int. Cl. H02m 7/02
U.S. Cl. 321—5                                  9 Claims

ABSTRACT OF THE DISCLOSURE

A firing circuit for semiconductive controlled rectifiers to be fired in sequence, characterized in that means are provided for storing energy at the gate of a controlled rectifier about to be fired from the drive pulse of the preceding rectifier, the stored energy being discharged into the gate of the rectifier about to be fired upon initiation of its drive pulse to supply momentary peak drive and prevent high local dissipation.

BACKGROUND OF THE INVENTION

Figure 1:
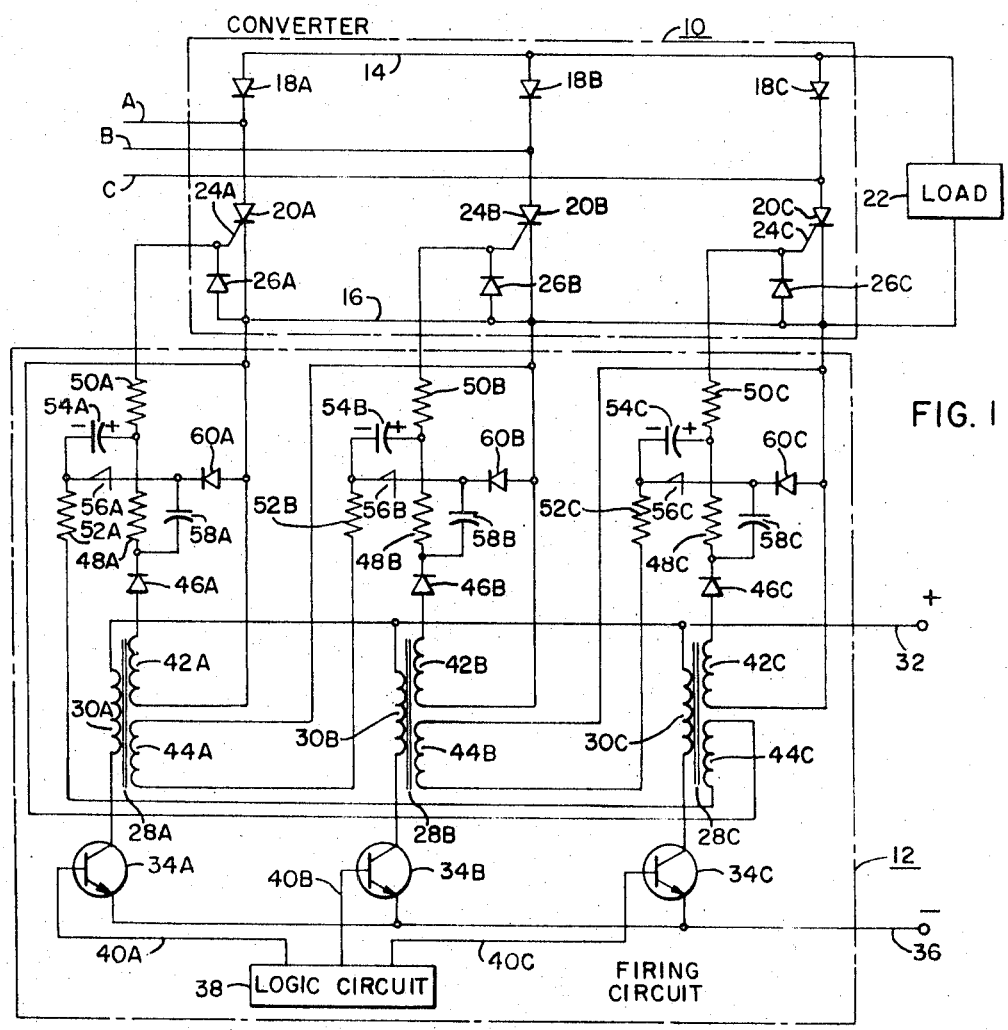

While not limited thereto, the present invention finds particular utility in converter circuits of the type in which a plurality of semiconductive controlled rectifiers are fired in succession. For example, in a three-phase alternating current to direct current converter, three of the rectifiers in a conventional three-phase full-wave rectifier are replaced by controlled rectifiers. By applying firing pulses to the three controlled rectifiers in timed sequence with each firing pulse lagging in the preceding pulse by 120°, and by varying the phases of the firing pulses, the periods of conduction of the controlled rectifiers and, hence, the load current can be varied.

In certain cases, it is necessary to turn on semiconductive controlled rectifiers, such as those employed in a converter, into low impedance, non-inductive loads. Under these circumstances, a very high rate of rise of anode current results. If the initial value of the supplied gate current is not high enough in this type of operation, the total anode current initially flows through a small area near the gate of the controlled rectifier, causing high local dissipation which may result in the destruction of the rectifier. In order to overcome this condition and possible destruction of the controlled rectifiers, it is highly desirable to fire them with pulses having very high initial magnitudes to prevent anode current from concentrating at a small area near the gate of the controlled rectifier.

SUMMARY OF THE INVENTION

As an overall object, the present invention provides means for firing semiconductive controlled rectifiers into low impedance, non-inductive loads without causing damage to the semiconductive controlled rectifiers themselves by virtue of excessive anode currents near the gate of the rectifier causing high local dissipation.

Another object of the invention is to provide new and improved means for generating gate firing pulses for semiconductive controlled rectifiers with very high initial magnitudes.

Still another object of the invention is to provide a gate firing system for semiconductive controlled rectifiers to be fired in sequence wherein energy is stored locally at the gate of a succeeding rectifier from the drive pulse of the preceding conducting controlled rectifier, this energy being discharged at the beginning of the conduction period of the succeeding controlled rectifier to provide momentary peak drive.

In accordance with the invention, pulse generating means are provided having a plurality of output terminals on which phase-displaced firing pulses appear in succession, pulse transformer means for each controlled rectifier, a primary winding for each transformer means operatively connected to an associated one of said output terminals and across which firing pulses appear, first and second secondary windings for each transformer means, means connecting the first secondary winding of each transformer means between the control electrode and cathode of an associated one of the plurality of semiconductive controlled rectifiers, means including a capacitor connecting opposite ends of the second secondary winding of each transformer means to the cathode and control electrode of the succeeding controlled rectifier of said plurality of rectifiers to be fired in succession whereby the capacitor will charge during the conduction period of the preceding controlled rectifier, and means operable at the beginning of a conduction period of each controlled rectifier for discharging its associated capacitor to supply momentary peak drive at said beginning of conduction.

Preferably, the pulse generating means is of the ring counter type and the means for discharging the capacitor to supply momentary peak drive comprises a Shockley diode which has a breakdown voltage nearly twice as high as the voltage to which the capacitor is initially charged. The Shockley diode is triggered by the firing pulse to the controlled rectifier with which it is associated such that when the firing pulse is initially received, the Shockley diode breaks down, the capacitor discharges, and momentary peak drive occurs at the beginning of firing.

The above and other objects and features of the invention will become apparent from the following detailed description taken in connection with the accompanying drawings which form a part of this specification, and in which:

FIGURE 1 is a schematic circuit diagram of one embodiment of the invention; and

Figure 2:
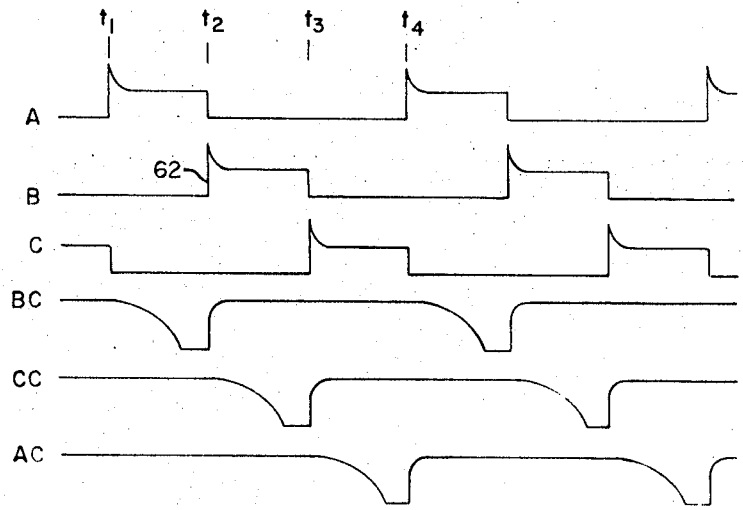

FIGURE 2 comprises waveforms appearing at various points in the circuit of FIG. 1.

With reference now to the drawings, and particularly to FIG. 1, the circuit shown includes an alternating current to direct current converter, enclosed by broken lines and generally indicated by the reference numeral 10. The converter 10 is controlled by a ring counter firing circuit, also enclosed by broken lines and identified by the reference numeral 12.

The converter 10 is supplied by the three phases or leads A, B and C of a three-phase alternating current supply, not shown. The converter itself includes three current paths connected between leads 14 and 16, each current path including a rectifier 18A, 18B or 18C and a semiconductor controlled rectifier 20A, 20B or 20C. The two leads 14 and 16, in turn, are connected to a load impedance, generally indicated by the reference numeral 22; and it will be assumed that the load is of the low impedance, non-inductive type.

The semiconductive controlled rectifiers 20A–20C, often referred to as "thyristors," are similar in operation to thyratrons. That is, they are normally non-conducting; however they may be triggered into conduction by application of a positive firing pulse to their gate electrodes 24A, 24B or 24C. Once the semiconductor controlled rectifiers are triggered into conduction, the gate loses control and the rectifier can be turned off only by a reverse bias or by reduction in anode voltage. In the converter, reduction in anode voltage and turn-off of the rectifiers occur due to the sinusoidal nature of the applied voltage. By varying the phases of the positive firing pulses applied to the gate electrodes 24A, 24B and 24C, their periods of conduction and, hence, the power supplied to load 22 can be varied. As shown, bypass diodes 26A, 26B and 26C are connected between the gate electrodes and cathodes of each of the controlled rectifiers 20A–20C.

The firing circuit 12 includes three pulse transformers 28A, 28B and 28C. Transformer 28A, for example, is provided with a primary winding 30A having one terminal connected to a source of positive potential at 32 and its other terminal connected to the collector of transistor 34A. The emitter of transistor 34A is connected to the negative terminal 36 of the aforesaid source of driving potential; while its base is connected to a ring counter type logic circuit 38 which produces clock pulses on leads 40A, 40B and 40C similar to those shown in waveforms A, B and C of FIG. 2, but without the peaked portions at the beginning of each pulse.

The transformer 28A, for example, is provided with two secondary windings 42A and 44A. One terminal of secondary winding 42A is connected to the cathode of controlled rectifier 20A in converter 10; while the other terminal of this same winding 42A is connected through diode 46A and resistors 48A and 50A to the gate electrode 24A of rectifier 20A. When the logic circuit 38 produces clock pulses, somewhat similar to the pulses in waveform A of FIG. 2 but without the peaks, they will be applied through transformer 28A and secondary winding 42A to the gate 4A of rectifier 20A, thereby causing it to fire. However, when the load 22 is a low impedance, non-inductive load, a very high rate of rise of anode current will flow initially through a small area near the gate of the rectifier 20A as was explained above, thereby causing high local dissipation which may result in destruction of the controlled rectifier. Accordingly, it becomes necessary to provide peaks at the beginning of each pulse applied to the gate electrodes in order to overcome this condition.

The circuitry for supplying the peaks at the beginning of each firing pulse includes the secondary winding 44A, for example, on transformer 28A. One terminal of winding 44A is connected to the cathode of controlled rectifier 20B; whereas the other terminal of winding 44A is connected through resistor 52B and capacitor 54B of the junction of resistors 48B and 50B in the firing circuitry for controlled rectifier 20B. Consider, for instance, that rectifier 20A is conducting at a given instant indicated at $t_1$ in FIG. 2. Between times $t_1$ and $t_2$, a positive gate drive pulse is applied continuously to the control electrode 24A. At the same time, the positive drive pulse appearing across secondary winding 44A charges capacitor 54B with the polarity shown in FIG. 1. That is, capacitor 54B charges via resistor 52B, resistor 50B and diode 26B. The voltage to which the capacitor 54B is charged is typically about twelve to fourteen volts.

Connected to the junction of resistor 52B and capacitor 54B as the cathode of a Shockley diode 56B, the anode of the diode 56B being connected through capacitor 58B to the junction of diode 46B and resistor 48B. The anode of Shockley diode 56B is also connected through diode 60B to the cathode of semiconductive controlled rectifier 20B.

The Shockley diode 56B has a breakdown voltage nearly twice as high as the voltage to which the capacitor 54B charges between times $t_1$ and $t_2$ shown in FIG. 2. That is, the Shockley diode has a breakdown voltage typically in the range of about twenty to twenty-two volts. At time $t_2$, the drive pulse is removed from the gate electrode 24A, and the logic circuit 38 applies a pulse to the primary winding 30B of transformer 28B to fire or turn on the next semiconductive controlled rectifier 20B. This firing pulse appears across the secondary winding 42B (waveform B in FIG. 2) and is applied to the Shockley diode 56B by the action of coupling capacitor 58B. The voltage across the Shockley diode 56B thus becomes higher than its breakdown voltage, whereupon the diode 56B breaks down and discharges into the gate electrode 24B through current limiting resistor 50B and diode 60B. By choosing the value of limiting resistor 50B to be appropriately small (i.e., about two to ten ohms), a peak drive current of several amperes can be achieved. The peak or spike at the beginning of the drive pulse for controlled rectifier 20B is indicated by the reference numeral 62 on waveform B of FIG. 2. The rectifier 20B will continue to conduct as long as the firing pulse applied to its gate electrode persists, or between times $t_2$ and $t_3$ in FIG. 2. At the same time, the voltage across capacitor 54B, illustrated as waveform BC in FIG. 2, rises in the positive direction indicating discharge of the capacitor.

Between times $t_1$ and $t_2$, the voltage across capacitor 54B, illustrated as waveform BC in FIG. 2, decreased exponentially in the negative direction. At time $t_2$, when controlled rectifier 20B is fired, the voltage on capacitor 54B increases in the positive direction and remains at the new voltage level until time $t_4$ is reached, whereupon controlled rectifier 20A again fires and capacitor 54B again charges.

Similarly, at time $t_3$, controlled rectifier 20C fires and capacitor 54C (waveform CC) discharges such that at the beginning of the firing pulse (waveform C in FIG. 2) a peaked waveform is produced; while the voltage across capacitor 54A, shown as waveform AC in FIG. 2, decreases exponentially in the negative direction. As can be seen from FIG. 2, the charging procedure of capacitors 54A, 54B and 54C follows a "ring" pattern with the firing of controlled rectifiers 20A, 20B and 20C; but the charging is always one stage advanced to the firing.

The time permitted to store energy is usually long (for a half-wave converter circuit it is approximately 5 milliseconds; and for a full-wave converter it is approximately 2.5 milliseconds). Therefore, resistors 52A, 52B and 52C can be reasonably large, at least several hundred ohms, meaning that the current needed for charging capacitors 54A, 54B and 54C is small, on the order of a few milliamperes. The energy required for breaking down the Shockley diodes 56A, 56B and 56C is also very small. Consequently, a drive circuit designed to supply only the minimum drive current of 150 to 250 milliamperes can comfortably be utilized in the arrangement shown to give the required high initial drive.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that the single transformers 28A, 28B and 28C with two secondary windings can be replaced by two transformers each with a single primary and single secondary winding with the same overall effect. It would also be understood that the term "Shockley diode" covers not only a Shockley diode per se, but also any other suitable voltage breakdown device providing the desired function.

Although the invention has been described in connection with sequential firing (rendering conductive) of a plurality of conduction control devices of a particular type, that is semiconductor controlled rectitfiers, the invention is applicable to and may be practiced in connection with other conduction control devices having main power electrodes and a control electrode for controlling the flow of power between the main electrodes, and where it is desired to apply control pulses having high initial magnitude. It is especially effective with semiconductor conduction control devices having main power electrodes and a control electrode, and operated in the switching mode, for example the semiconductor controlled rectifiers illustrated herein. It may be noted that in a semiconductor controlled rectifier, the control electrode is the gate electrode, and the main electrodes are the anode and cathode electrodes.

I claim as my invention:

1. In circuitry for supplying firing pulses in succession to a plurality of semiconductor conduction control devices each having a control electrode and first and second main electrodes, the combination of pulse generating means having a plurality of output terminals on which phase-displaced firing pulses appear in succession, pulse transformer means for each semiconductor conduction control device, a primary winding for each transformer means operatively connected to an associated one of said output terminals and across which firing pulses appear, first and second secondary windings for each transformer means, means connecting the first secondary winding of each transformer means between the control electrode and the first main electrode of an associated one of said conduction control devices, means including a capacitor connecting opposite ends of the second secondary winding of each transformer means to the second main electrode and control electrode of a succeeding conduction control device of said plurality of devices to be fired in succession whereby the capacitor will charge during the conduction period of the preceding conduction control device, and means operable at the beginning of a conduction period of each conduction control device for discharging its associated capacitor to supply momentary peak drive at said beginning of conduction.

2. The combination of claim 1 wherein the means connecting opposite ends of the second secondary winding of each transformer to the second main electrode and control electrode of the succeeding conduction control device comprises a connection between one end of the secondary winding and the first main electrode of the succeeding conduction control device, and a series current path including said capacitor intermediate first and second current limiting resistors connecting the other end of said secondary winding to the control electrode of said succeeding conduction control device.

3. The combination of claim 2 including a Shockley diode connected between the junction of said capacitor and one of said current limiting resistors and the first main electrode of said succeeding conduction control device.

4. The combination of claim 3 wherein the cathode of said Shockley diode is connected to the junction of said current limiting resistor and capacitor, and including a diode connecting the anode of said Shockley diode to the first main electrode of said succeeding conduction control device.

5. The combination of claim 4 wherein said means connecting the first secondary winding of each transformer between the control electrode and first main electrode of its associated conduction control device comprises a connection between one end of said first secondary winding and the first main electrode of the conduction control device, a current path including a diode in series with a resistor connecting the other terminal of said first secondary winding to the control electrode of said associated conduction control, and a capacitor connected between the junction of said last-mentioned diode and resistor and the junction of said first-mentioned diode and Shockley diode.

6. The combination of claim 5 including a bypass diode connected between the control electrode and the first main electrode of each conduction control device.

7. The combination of claim 1 wherein said conduction control devices are included in a three-phase alternating current to direct current converter.

8. The combination according to claim 1 wherein the pulse generating means is of the ring counter type.

9. The combination as in claim 1 wherein each of said semiconductor conduction control devices is a semiconductor controlled rectifier, whose first and second main electrodes are respectively cathode and anode, and whose control electrode is its gate terminal.

References Cited

UNITED STATES PATENTS

| | | | |
|---|---|---|---|
| 2,494,246 | 1/1950 | Keller | 321—41 X |
| 2,917,714 | 12/1959 | Jensen | 321—34 X |
| 2,925,545 | 2/1960 | Fischer | 321—41 X |
| 3,281,645 | 10/1966 | Spink | 321—47 |
| 3,287,576 | 11/1966 | Hotto. | |

JOHN F. COUCH, Primary Examiner

W. H. BEHA, Jr., Assistant Examiner

U.S. Cl. X.R.

321—11, 47